Feb. 24, 1953   I. CHAFINS   2,629,113
ROTARY AUGER AND SAW BIT
Filed Nov. 19, 1948

Ishmael Chafins
INVENTOR.

Patented Feb. 24, 1953

2,629,113

UNITED STATES PATENT OFFICE 2,629,113

ROTARY AUGER AND SAW BIT

Ishmael Chafins, Wooton, Ky., assignor of fifty per cent to Lewis Howard, Wooton, Ky.

Application November 19, 1948, Serial No. 61,078

1 Claim. (Cl. 7—1)

This invention relates to a rotary bit adapted to cut axially and laterally for use as an auger or drill, or as a rotary saw.

An object of the invention is to provide a highly efficient rotary bit which will clear itself and by means of which a hole may be bored and enlarged laterally for cutting mortises.

Another object is to provide a rotary bit adapted to be used in the chuck of a portable high speed driving tool for boring and performing various cutting, sawing, milling and other operations.

A further object is to provide a durable rotary bit which will readily enter the work axially in boring, and which will effectively and expeditiously perform lateral cutting or sawing operations.

The exact nature of the present invention will become apparent from the following description when considered in connection with the accompanying drawing, in which.

Figure 1:
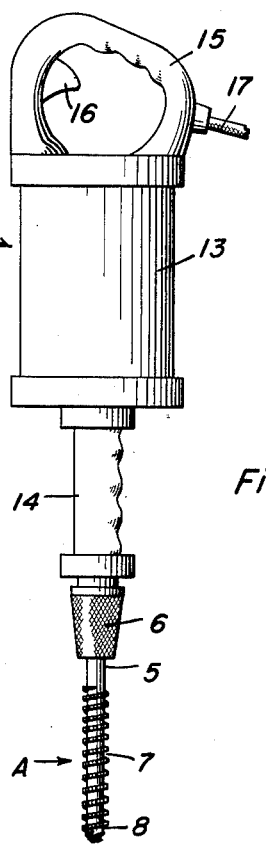
Figure 1 is a side elevational view of a portable driving tool having a bit secured in the chuck thereof, which bit is constructed in accordance with the present invention.
Figure 2:
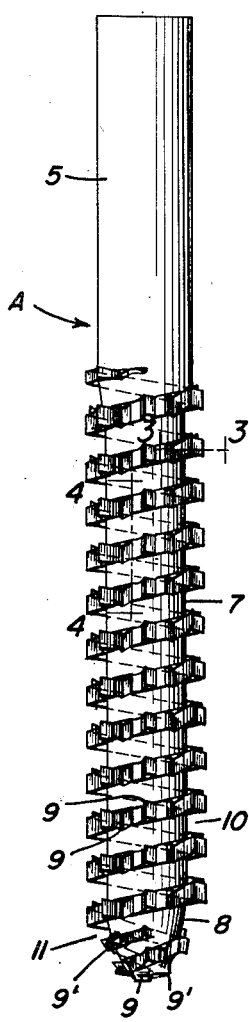
Figure 2 is an enlarged side elevational view of the bit.
Figure 3:
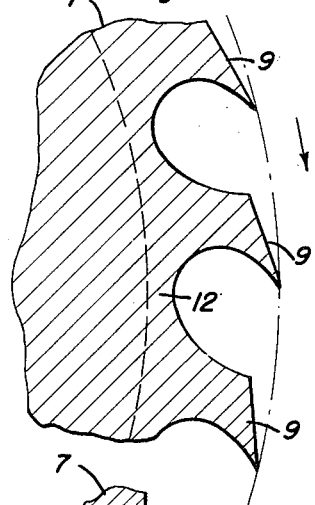
Figure 4:
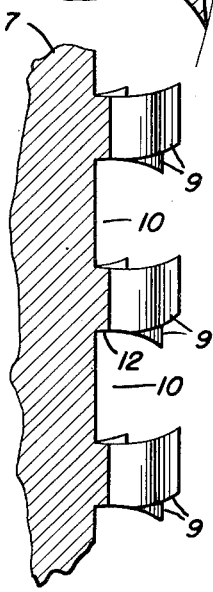
Figure 5:
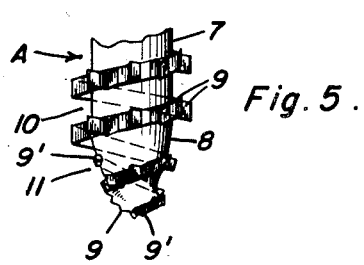

Figures 3 and 4 are enlarged fragmentary sectional views taken respectively on the lines 3—3 and 4—4 of Figure 2;

Figure 5 is a fragmentary side elevational view showing the work entering end portion of the bit as it appears when turned to the left about ninety degrees from the position of Figure 2.

Referring in detail to the drawing, the present bit A comprises a slender solid substantially cylindrical member having an attaching portion 5 adapted to be secured in the rotary driven chuck 6 of a portable high speed driving tool B, and a cutting portion 7 having a tapering work entering end 8 and provided on its surface with a continuous series of integral adjoining saw teeth 9 that are arranged in spiral fashion from the inner end of the portion 7 to the tip of the end 8. The convolutions of the spirally arranged teeth are uniformly spaced as at 10 to the tapered end 8, where the spacing may be slightly increased as at 11, and a secondary spiral series of similar saw teeth 9' may be disposed midway between the convolutions of teeth 9 on the end 8 and extended to the tip of the latter. Due to the tapered form of the end 8 and the provision of the spirally arranged teeth 9 and 9' thereon to the tip thereof, said end 8 will readily enter or drill into the work when the bit is rotated.

The teeth 9 and 9' are hook shaped and are alternately set laterally in opposite directions as clearly shown, to prevent binding and to leave no part of the work uncut in the path of the advancing bit. As shown, the portion 7 has a continuous shallow spiral rib 12 from which the teeth 9 project.

The driving tool B is of conventional construction and comprises a housing 13 for a motor, which may be of a high speed electric motor. A housing 14 is attached to the motor housing and encases an extended end of the rotor shaft which carries the chuck 6. The motor housing 13 is provided with a handle grip 15 which houses a trigger switch 16 for controlling the source of energy to the motor. An extension cord 17 projects from the handle grip 15 and is adapted to be connected to a source of electrical supply. Also, the housing 14 is adapted to form a suitable hand grip.

As thus constructed, the present bit may be used to bore or drill axially, or to cut, mill or saw laterally for performing many different operations. It may be used to bore a circular entering hole and may then be moved laterally to enlarge the hole in any direction to form mortises, etc. By providing a continuous series of spirally arranged hook shaped teeth which are adjoined and are set laterally, I have succeeded in producing a bit of the character described which has proven very durable and efficient in actual use.

Having described the invention, what is claimed as new is:

A rotary auger and saw bit comprising a slender solid substantially cylindrical member having an attaching portion and a cutting portion terminating in a tapered work entering end, said cutting portion being provided on its surface with a continuous spiral of integral adjoining hook-shaped saw teeth, said saw teeth being alternately set laterally in the spiral in opposite directions, the convolutions of the spiral being uniformly spaced to said tapered end and having the spacing thereof slightly increased on said end, and a secondary spiral series of similar saw teeth provided on said tapered end mid-way between the convolutions of the first named teeth on said tapered end, said secondary teeth being extended to the tip of said tapered end.

ISHMAEL CHAFINS.

REFERENCES CITED

The following references are of record in the file of this patent:

UNITED STATES PATENTS

| Number | Name | Date |
|---|---|---|
| 48,759 | Zimmerman | July 11, 1865 |
| 233,008 | Oldham | Oct. 5, 1880 |
| 337,018 | Rendall | Mar. 2, 1886 |
| 2,238,578 | Burkeman | Apr. 15, 1941 |

FOREIGN PATENTS

| Number | Country | Date |
|---|---|---|
| 60,044 | Austria | July 10, 1913 |
| 522,605 | Germany | Apr. 11, 1931 |